(12) United States Patent
Sandahl et al.

(10) Patent No.: US 12,515,745 B2
(45) Date of Patent: Jan. 6, 2026

(54) POWERTRAIN ASSEMBLY FOR A VEHICLE

(71) Applicant: Volvo Car Corporation, Gothenburg (SE)

(72) Inventors: Anders Sandahl, Gothenburg (SE); Erik Sandborg, Gothenburg (SE); Domenico Macri, Gothenburg (SE); Gunnar Sahlin, Gothenburg (SE); Anders Markström, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 373 days.

(21) Appl. No.: 18/092,963

(22) Filed: Jan. 4, 2023

(65) Prior Publication Data

US 2023/0227108 A1    Jul. 20, 2023

(30) Foreign Application Priority Data

Jan. 18, 2022  (EP) ..................................... 22152010

(51) Int. Cl.
*B62D 21/15*    (2006.01)
*B62D 21/11*    (2006.01)

(52) U.S. Cl.
CPC ............ *B62D 21/152* (2013.01); *B62D 21/11* (2013.01)

(58) Field of Classification Search
CPC ...... B62D 21/11; B62D 21/15; B62D 21/152; B60K 5/1275
See application file for complete search history.

(56) References Cited

U.S. PATENT DOCUMENTS

| | | | | |
|---|---|---|---|---|
| 5,992,555 A * | 11/1999 | Sakamoto | ............... | B60R 21/00 180/232 |
| 6,761,242 B2 * | 7/2004 | Yoshida | ............... | B62D 21/155 180/274 |
| 7,588,117 B2 * | 9/2009 | Fukuda | ............... | B62D 21/155 180/291 |
| 9,371,009 B2 * | 6/2016 | Ishikawa | ............. | H01M 8/2457 |
| 10,071,772 B2 * | 9/2018 | Sasaki | ................... | B62D 21/11 |

(Continued)

FOREIGN PATENT DOCUMENTS

JP    2002274194 A    9/2002

OTHER PUBLICATIONS

Jul. 5, 2022 European Search Report issued in corresponding EP Application No. 22152010.

*Primary Examiner* — Brian L Swenson
(74) *Attorney, Agent, or Firm* — Clements Bernard Walker; Christopher L. Bernard

(57) ABSTRACT

A powertrain assembly including a powertrain unit with a drive shaft, at least a first mount and at least a first coupling arm, arranged to direct the drive shaft substantially perpendicular to a driving direction of the vehicle. The first mount is arranged substantially perpendicular to the drive shaft. The first coupling arm is arranged between a first end side of the powertrain unit and the first mount and is connected to the powertrain unit by at least a first fixing element to hold the powertrain unit in an initial position. The first coupling arm is configured to clash into the first mount in case of a vehicle collision. The first fixing element is configured to be sheared off from the first coupling arm to at least partially disconnect the powertrain unit from the first coupling arms after the clash of the first coupling arm into the first mount.

18 Claims, 4 Drawing Sheets

(56) References Cited

U.S. PATENT DOCUMENTS

| | | | |
|---|---|---|---|
| 10,717,468 B2* | 7/2020 | Hara | B62D 21/152 |
| 2003/0209380 A1* | 11/2003 | Anzai | B62D 21/00 |
| | | | 180/312 |
| 2013/0105241 A1 | 5/2013 | Christian et al. | |
| 2021/0394833 A1 | 12/2021 | Carl | |

* cited by examiner

POWERTRAIN ASSEMBLY FOR A VEHICLE

CROSS-REFERENCE TO RELATED APPLICATION

The present disclosure claims the benefit of priority of co-pending European Patent Application No. 22 152 010.9, filed on Jan. 18, 2023, and entitled "POWERTRAIN ASSEMBLY FOR A VEHICLE," the contents of which are incorporated in full by reference herein.

TECHNICAL FIELD

The present disclosure relates to a powertrain assembly for a vehicle, a vehicle including such a powertrain assembly and a method for manufacturing such a powertrain assembly for a vehicle.

BACKGROUND

In spite of new technology in the area of vehicle active safety, vehicle crashes are still very common. Accordingly, various rating and/or legal requirements are enforced to reduce severe crash events. In case of electric vehicles, a front crash event may lead to a critical situation, since the electric vehicles include generally a shorter front overhang (FOH), which would provide less deformation space of components arranged in the front overhang. Therefore, there is a need to utilize available space as much as possible in order to maximize a stopping distance by allowing more deformation space in the front overhang and ensure a low vehicle pulse index (VPI) or occupant load criteria (OLC).

SUMMARY

Hence, there may be a need to provide an improved powertrain assembly, which may increase safety of a vehicle.

The problem is at least partially solved or alleviated by the subject matter of the present disclosure. It should be noted that the aspects of the disclosure described in the powertrain assembly for a vehicle, the vehicle including such the powertrain assembly and the method for manufacturing a powertrain assembly for a vehicle.

According to the present disclosure, a powertrain assembly for a vehicle is presented. The powertrain assembly includes a powertrain unit with a drive shaft, at least a first mount and at least a first coupling arm. The drive shaft of the powertrain unit is arranged substantially perpendicular to a driving direction of the vehicle. The first mount is arranged substantially perpendicular to the drive shaft. The first coupling arm is arranged between a first end side of the powertrain unit and the first mount. The first coupling arm is connected to the powertrain unit by means of at least a first fixing element to hold the powertrain unit in an initial position. The first coupling arm is configured to clash into the first mount in case of a vehicle collision. The first fixing element is configured to be sheared off from the first coupling arm to at least partially disconnect the powertrain unit from the first coupling arms after the clash of the first coupling arm into the first mount.

The powertrain assembly according to the present disclosure may ensure a safe and robust crash behavior of the vehicle. By at least partially disconnecting the powertrain unit from the first coupling arm during the vehicle collision, the powertrain unit may be released from a rigid structure and shifted inside the engine compartment, a front overhang and/or a rear overhang of the vehicle to gain additional deformation space, for instance during a frontal vehicle collision. The term "front overhang" may be understood in a front portion of the vehicle between a foremost end and front wheels of the vehicle and the term "rear overhang" may be understood in a rear portion of the vehicle between a rearmost end and rear wheels of the vehicle. Accordingly, by providing more deformation space, a stopping distance of the vehicle collision may be extended.

In case of an electric vehicle, the vehicle may include a shorter front overhang than a conventional vehicle including an internal combustion engine. Therefore, the powertrain assembly may avoid or at least minimize intrusions of components arranged in the engine compartment and/or the front overhang into a vehicle cabin and/or an energy storage system, which may be arranged at an underside of the vehicle cabin.

The powertrain unit may be arranged in an electric vehicle, such as a battery electric vehicle or a hybrid electric vehicle to propel the vehicle by electric power. Thus, the powertrain unit may be supplied with energy by an electric energy storage system. The powertrain unit may further include an electric machine, power electronics such as inverters, direct current converters, charging electronics, and computing units or the like. The drive shaft of the powertrain unit may be configured for delivering torque to wheels of the vehicle by rotating. Preferably, the powertrain unit may be an electric front axle drive (EFAD) arranged at the front portion of the vehicle relative to the driving direction of the vehicle. The drive shaft of the powertrain unit may be aligned substantially perpendicular to the driving direction of the vehicle to propel the wheels arranged in pairs at each lateral side of the vehicle.

The first mount may include a rubber bushing configured for absorbing or damping vibration transferred to a vehicle body portion. The first mount may be arranged substantially perpendicular to a longitudinal axis of the drive shaft, i.e. substantially parallel to the driving direction of the vehicle. The term substantially perpendicular may be understood as an angle between an longitudinal axis of the first mount and the longitudinal axis of the drive shaft between 70° to 120°.

The powertrain unit may be formed substantially in a cylinder shape. The powertrain unit may thus include the first end side and a second end side. The first mount may be arranged substantially perpendicular to the first end side of the powertrain unit. Preferably, the first mount may be arranged at a rear side of the powertrain unit relative to the driving direction of the vehicle. In other words, the first mount may be arranged between the powertrain unit and the vehicle cabin. Alternatively, the first mount may be arranged at a front side of the powertrain unit relative to a driving direction of the vehicle.

The first coupling arm may be positioned at the first end side of the powertrain unit and configured to connect the powertrain unit, particularly the first side of the powertrain unit and the first mount. More specifically, the first coupling arm may be arranged between the first side of a housing of the powertrain unit and the first mount, which may be arranged at the rear side of the powertrain unit. The first coupling arm may be formed as a rod, semicircle, or the like, which may be fitted to the first end side of the housing of the powertrain unit.

The powertrain assembly may include at least a first fixing element. Preferably, the powertrain assembly may include a plurality of fixing elements. The fixing element may be any kind of fasteners such as screw, bolt, pin, plug, nail or the like. The first coupling arm may be fixedly attached to the powertrain unit, preferably the housing of the powertrain unit by the first fixing element. Accordingly, the powertrain unit may be held in the initial position by means of the first coupling arm and the first mount in a normal state, i.e. assembled state without a vehicle collision.

In case of the vehicle collision, particularly a frontal collision, the powertrain unit may be shoved in a direction of the vehicle cabin. Consequently, the first coupling arm mounted at the powertrain unit may also move in a reverse driving direction of the vehicle, i.e. in a rear direction of the powertrain unit and clash into the first mount.

Due to the clash between the first coupling arm and the first mount, the first fixing element may receive the impact energy. Consequently, the first fixing element may be sheared off from or fall out of the first coupling arm. Hence, the first coupling arm may be at least partially disconnected from the powertrain unit. The term "at least partially disconnected" may be understood such that at least a part of the first coupling arm may be still connected to the powertrain unit and some part of the first coupling arm, at which the first fixing element is sheared off, may be released from the powertrain unit. Alternatively, the first coupling arm may be completely separated from the powertrain unit during the vehicle collision.

After the first fixing element is sheared off, the powertrain unit may be able to freely move relative to the coupling arm. Accordingly, vehicle crash pulse and/or a stack up distance between the drive shaft of the powertrain unit and the first coupling arm can be reduced.

Generally, a coupling arm connecting the powertrain unit and the first mount is manufactured integrally with the housing of the powertrain unit. However, such coupling arm may limit a movement of the powertrain unit and/or a frame supporting the powertrain unit. Hence, disconnecting the powertrain unit from the first mount can be difficult and/or damageable. In contrast, the first coupling arm, which is separately arranged between the housing of the powertrain unit and the first mount, may be easily disconnected by shearing off the fixing element.

In an example, the powertrain assembly further includes a second mount arranged at an opposite side of the first mount relative to the drive shaft of the powertrain unit. The second mount is arranged substantially perpendicular to the first mount. The second mount may be also configured to hold the powertrain unit in the initial position. The first mount and the second mount may be arranged opposite to each other relative to the powertrain unit. Preferably, the first mount may be arranged at the rear side of the powertrain unit and the second mount may be arranged at the front side of the powertrain unit relative to the driving direction of the vehicle. The second mount may be aligned substantially perpendicular or parallel to the longitudinal axis of the drive shaft.

In an example, the powertrain assembly further includes a frame element. The frame element is connectable to a vehicle body portion. The first mount and/or the second mount are attached to the frame element. The frame element may be configured to receive the powertrain unit and secure it. The frame element may be preferably connected to the front overhang portion of the vehicle. Additionally or alternatively, the frame element may be arranged together with the powertrain unit, the first mount and/or the second mount at a rear overhang portion of the vehicle.

The powertrain unit may be arranged between the first mount and the second mount such that the drive shaft of the powertrain unit may be aligned substantially perpendicular to the driving direction of the vehicle. The powertrain unit may be held in the initial position on the frame element via the first mount and/or the second mount, which may be fixedly attached to the frame element, wherein the first mount may be connected to the powertrain unit via the first coupling arm. Additionally, the powertrain unit may be also directly attached to the frame element.

The first mount may be attached to the frame element such that an axial direction of the first mount may be substantially perpendicular to the longitudinal axis of the drive shaft and the second mount may be attached to the frame element to be aligned perpendicular to the first mount. Alternatively, the first mount may be attached to the frame element such that the axial direction of the first mount may be substantially parallel to the longitudinal axis of the drive shaft and the second mount may be attached to the frame element to be aligned perpendicular to the first mount. The first mount and/or the second mount may be also integrally formed with the frame element.

In an example, the frame element is deformable substantially in a reverse driving direction of the vehicle in case of the vehicle collision. The powertrain unit is movable along the deformation of frame element. If the vehicle collision is a frontal collision and collision impact is strong enough, the frame element may be pushed and deformed or even distorted in the direction of the vehicle cabin. Accordingly, the powertrain unit arranged on the frame element may be also shifted substantially in the vehicle collision direction, i.e. reverse driving direction of the vehicle.

During the vehicle collision, the first fixing element may be sheared off from the first coupling arm, thus the first coupling arm may be at least partially disconnected from the powertrain unit. This may facilitate the movement of the powertrain unit along the deformation of the frame element. In such cases, the powertrain unit may be displaced in a vertical, a horizontal and/or a radial direction of the drive shaft of the powertrain unit relative to the first mount. By shifting the position of the powertrain unit along the deformation of the frame element, more deformation space for the frame element may be provided.

During shifting the position of the powertrain unit, the position of the drive shaft of the powertrain unit may be also displaced. Preferably, the powertrain unit may be capable to move such that a stack up distance between the drive shaft and the first coupling arm may be minimized, thus safety of the vehicle during the vehicle collision may be improved.

In an example, the powertrain assembly further includes a second fixing element. The second fixing element is connected between the powertrain unit and the first coupling arm and configured to hold the powertrain unit during the vehicle collision. The second fixing element may be also arranged at the first coupling arm to engage the first coupling arm with the powertrain unit in addition to the first fixing element. However, in contrast to the first fixing element, the second fixing element may be firmly connected to the powertrain unit via the first coupling arm during the vehicle collision, while the first fixing element may be sheared off from the first coupling arm, preferably at an early stage of the vehicle collision. Accordingly, during the vehicle collision, some part of the first coupling arm may be disconnected from the powertrain unit due to the first fixing element sheared off, whereas another part of the first coupling arm may be still connected to the powertrain unit due to the second fixing element. At an end stage of the vehicle collision, however, the second fixing element may be also sheared off from the first coupling arm.

In an example, the first fixing element may be arranged at a first end portion of the first coupling arm and the second fixing element may be arranged at a second end portion of the first coupling arm, wherein the first end portion of the first coupling arm may face the first mount. Alternatively, the second fixing element may be arranged at a first end portion of the first coupling arm and the first fixing element may be arranged at a second end portion of the first coupling arm. Further, the second end portion of the first coupling arm may also face the first mount. Preferably, the second fixing element may be arranged at the first coupling arm farthest from the first mount along a circumferential direction of the powertrain unit.

In an example, the powertrain unit is configured to rotate around the second fixing element in case of the vehicle collision to reduce vehicle crash pulse and/or intrusions in direction to a vehicle cabin. Since the second fixing element may be remained connected between the first coupling arm and the powertrain unit during the vehicle collision, the second fixing element may form a rotation axis of the powertrain unit along an axial direction of the second fixing element when the frame element is deformed. Accordingly, the powertrain unit may rotate around the second fixing element, after the first fixing element is sheared off from the first coupling arm. The second fixing element may be arranged coaxial with the drive shaft of the powertrain unit or arranged offset from an axial direction of the drive shaft. The second fixing element may be arranged at a center of the first end surface of the powertrain unit or offset from the center of the first end surface.

The powertrain unit may rotate in a clockwise direction or a counter-clockwise direction around the second fixing element. Preferably, the powertrain unit may rotate in an arrangement direction of the fixing elements, i.e. from the first fixing element to the second fixing element, which may result in a displacement of the drive shaft of the powertrain unit in direction to the first mount. Accordingly, the vehicle crash pulse may be reduced and/or intrusions of the components arranged at the frame element may be prevented from invading in the vehicle cabin and the energy storage system.

In an example, the powertrain assembly further includes a third fixing element. The third fixing element is arranged at the first coupling arm to further connect the first coupling arm to the powertrain unit. The third fixing element is configured to be sheared off from the first coupling arm in case of the vehicle collision. Generally, the third fixing element may be configured to hold the powertrain unit in the position in the assembled state without the vehicle collision. However, during the vehicle collision, the first coupling arm may clash with the first mount, which may cause the first fixing element to be sheared off from the first coupling arm, thus allow the powertrain unit to rotate around the second fixing element. However, the rotation of the powertrain unit may be limited by the third fixing element connecting the first coupling arm and the powertrain unit.

The third fixing element may be configured to be sheared off from the first coupling arm after a disengagement of the first fixing element due to the clash of the first coupling arm into the first mount during the vehicle collision. In other words, only the second fixing element may be connected between the first coupling arm and the powertrain unit during the vehicle collision to provide a rotation axis of the powertrain unit, whereas the first fixing element and the third fixing element may be sheared off from the first coupling arm. Accordingly, the powertrain unit may be able to further rotate to further gain frame-deformation space and avoid intrusions of the components arranged at the frame element in direction to the vehicle cabin and/or the energy storage system.

In an example, the first fixing element, second fixing element and/or the third fixing element is configured to receive shear off force induced by the clash of the first coupling arm into the first mount. Since the first coupling arm may clash into the first mount, impact energy between the first coupling arm and the first mount may be transferred to the first fixing element and/or the third fixing element, which may cause them to be sheared off from the first coupling arm. Accordingly, the impact energy may be regarded as the shear off force of the first fixing element and/or the third fixing element. Hence, the shear off force may be directed from the first mount to the powertrain unit, which may substantially correspond to the driving direction of the vehicle in case of a frontal vehicle collision.

The first coupling arm and the first mount may be encountered during the vehicle collision in the collision direction and/or the direction of the vehicle cabin. This may induce counterforce from the first mount in direction to the first coupling arm, i.e. opposite to the collision direction, which may be transferred to the first fixing element, the third fixing element and/or further fixing elements arranged between the first fixing element and the second fixing element. Thus, the fixing elements may be sheared off from the first coupling arm if the transferred shear off force exceeds connecting force of each fixing element between the first coupling arm and the powertrain unit.

In an example, the first coupling arm includes several holes for receiving each of the first fixing element, the second fixing element and the third fixing element wherein the holes include a different size. In other words, the first coupling arm may include at least a first hole for receiving the first fixing element, a second hole for receiving the second fixing element and a third hole for receiving the third fixing element. Preferably, at least two or each of the first hole, the second hole and the third hole may include different size.

For instance, the first hole may be smaller than the third hole. The first hole and the third hole may have a different size, which may allow the first fixing element and the third fixing element to be sheared off from the first coupling arm in a sequence after one another. Meanwhile, at least the first fixing element and the third fixing element may have the same size. However, the first hole may be also bigger than the third hole or the first hole and the third hole may have the same size. Alternatively or additionally, at least two or each of the first fixing element, the second fixing element and the third fixing element may include a different shape and/or size to allow a sequential shear off of the fixing element.

If the first coupling arm includes more than three fixing elements, the first coupling arm may also include more than three holes to individually receive each fixing element. The size of the holes may gradually increase or decrease from the first fixing element in direction to the second fixing element to sequentially shear off the fixing elements from the first coupling arm, thus gradually disconnect the first coupling arm from the powertrain unit.

In an example, the third fixing element is arranged between the first fixing element and the second fixing element wherein the first fixing element, the second fixing element and the third fixing element are configured to be sheared off from the first coupling arm sequentially. The first, the second and the third fixing elements may be arranged at the first coupling arm in such an order that the first fixing element faces the first mount at an initial stage of the vehicle collision and the third fixing element faces the first mount after the first fixing element is sheared off and/or along the deformation of the frame element.

In other words, the first fixing element may be arranged closest to the first mount, the second fixing element may be arranged farthest to the first mount among the fixing elements along the first coupling arm and the third fixing element may be arranged therebetween. Still in other words, the first fixing element, the third fixing element and the second fixing elements may be arranged in this order at the first coupling arm along a rotation direction of the powertrain unit during the vehicle collision.

In an example, more than three fixing elements may be arranged at the first coupling arm to engage the first coupling arm with the powertrain unit. In such a case, the first fixing element, which may be arranged closest to the first mount in an assembled state, may be sheared off firstly from the first coupling arm during the vehicle collision. Whereas the second fixing element, which may be arranged farthest from the first mount may remain connected between the first coupling arm and the powertrain unit.

Other fixing elements arranged between the first fixing element and the second fixing element may be sheared off from the first coupling arm during the vehicle collision in a predefined sequence after one another in a clockwise direction or counter-clockwise direction, after the first fixing element is sheared off. For instance, while the powertrain unit rotates, preferably in a counter-clockwise direction along with the deformation of the frame element, the fixing elements may be sheared off sequentially in the same rotation direction of the powertrain unit, i.e. counter-clockwise direction. Alternatively, two or more fixing elements may be also sheared off simultaneously from the first coupling arm along the rotation direction of the powertrain unit.

The arrangement of the first fixing element, the second fixing element and the third fixing element at the first coupling arm and the different size of the holes and/or fixing elements may cause different shear off force applied to each fixing element. In particular, the first fixing element may be arranged closest to the first mount in the initial position followed by the third fixing element and the second fixing element may be arranged farthest to the first mount. Further, the first hole receiving the first fixing element may be smaller than the third hole receiving the third fixing element.

Accordingly, the shear off force applied to the first fixing element may be bigger than the shear off force applied to the third fixing element. Hence, the first fixing element may be sheared off from the first coupling arm prior to the third fixing element. In addition, the shear off force applied to the third fixing element may be bigger than the shear off force applied to the second fixing element such that the third fixing element may be sheared off from the first coupling arm prior to the second fixing element. In this manner, a sequential shear off of the fixing elements may be realized. As a result, the rotation of the powertrain unit during the vehicle collision may be facilitated.

In an example, the first fixing element and/or third fixing element may be exchangeable. The fixing elements sheared off from the first coupling arm may be easily replaced, which may facilitate a maintenance or repair work after the vehicle collision.

In an example, the powertrain assembly further includes a second coupling arm and a third mount. The second coupling arm and the third mount are arranged at an opposite side of the first coupling arm and the first mount relative to the powertrain unit. In other words, the second coupling arm and the third mount may be arranged at a second end side of the powertrain unit. Same as at the first end side, at the second end side of the powertrain unit, the second coupling arm may be connected to the powertrain unit via several fixing elements. Still in other words, the powertrain assembly may be symmetrically constructed.

The third mount may be also arranged substantially perpendicular to the drive shaft. The second coupling arm may be arranged between the second end side of the powertrain unit and the third mount to hold the powertrain unit in the initial position. The second coupling arm may be also configured to clash into the third mount in case of the vehicle collision. The fixing elements arranged at the second coupling arm may be also configured to be sequentially sheared off in case of the vehicle collision.

The powertrain assembly may further include a fourth mount arranged at an opposite side of the third mount relative to the powertrain unit to face each other, hence, the fourth mount may face the third mount. Additionally, the fourth mount may be aligned substantially perpendicular to the third mount. The third mount and/or the fourth mount may be also attached to the frame element to hold the powertrain unit in the initial position.

In an example, the second mount and/or the fourth mount may include a plurality of mount elements. In other words, the second mount and/or the fourth mount, which may support the powertrain unit at the front side of the powertrain unit relative to the driving direction of the vehicle, may include several mount elements to safely hold the powertrain unit in the initial position.

In an example, the powertrain unit may be disconnectable from the frame element in case of the vehicle collision. Along the deformation of the frame element during the vehicle collision, preferably at a late stage of the vehicle collision, the second mount and/or the fourth mount, which may directly connect the frame element and the powertrain unit without any coupling arm, may be broken. Accordingly, the powertrain unit may be at least partially disconnected or separated from the frame element, which may also facilitate the displacement of the powertrain unit during the vehicle collision.

In an example, at least one of the first coupling arm and the second coupling arm is configured to stack up against the drive shaft of the powertrain unit in an end stage of the vehicle collision. The powertrain assembly may be configured such that the powertrain unit may rotate due to the disengagement of the first fixing element and/or the third fixing element to minimize a distance between the drive shaft of the powertrain unit and the first coupling arm. Hence, in the end stage of the vehicle collision, at which the frame element may be entirely deformed in reverse driving direction of the vehicle, either the first coupling arm or the second coupling arm may stack up against the drive shaft of the powertrain unit.

Hence, crash loads may be distributed in direction to the first mount and/or the third mount via the stacked drive shaft and the first coupling arm and/or the second coupling arm, which may define a strong main load path. In other words, the crash force may be guided to a lateral side of the vehicle to prevent components arranged in the engine compartment of the vehicle from invading in the vehicle cabin and the energy storage system, thus to increase safety of the vehicle.

According to the present disclosure, a vehicle is presented. The vehicle includes a powertrain assembly as described above. The vehicle is a battery electric vehicle or a hybrid electric vehicle. The electric vehicles include an energy storage system for supplying energy to propel the vehicle. The energy storages system may be preferably arranged, for instance at a bottom portion of the vehicle cabin, which may be in danger in case of the vehicle collision. The powertrain assembly according to the present application may prevent components, arranged particularly in a front overhang and/or a rear overhang of the vehicle, from invading in the vehicle cabin and the energy storage system, thus increase safety of the vehicle.

In an example, a powertrain unit is an electric front axle drive (EFAD) unit. Accordingly, the powertrain assembly may be arranged in the front overhang of the vehicle to damp the vehicle collision by at least partially disconnecting the EFAD unit from a first and/or second coupling arm.

According to the present disclosure, a method for manufacturing a powertrain assembly for a vehicle is presented. The method includes, but not necessarily in this order:
arranging a drive shaft of a powertrain unit substantially perpendicular to a driving direction of the vehicle,
arranging a first mount substantially perpendicular to the drive shaft,
arranging a first coupling arm between a first end side of the powertrain unit and the first mount, and
connecting the first coupling arm to the powertrain unit by means of at least a first fixing element to hold the powertrain unit in an initial position.

The first coupling arm is configured to clash into the first mount in case of a vehicle collision. The first fixing element is configured to be sheared off from the first coupling arm to at least partially disconnect the powertrain unit from the first coupling arms after the clash of the first coupling arm into the first mount.

It should be noted that the above examples may be combined with each other irrespective of the aspect involved. Accordingly, the method may be combined with structural features and, likewise, the system may be combined with features described above with regard to the method.

These and other aspects of the present examples will become apparent from and elucidated with reference to the examples described hereinafter.

BRIEF DESCRIPTION OF THE DRAWINGS

Examples according to the present disclosure will be described in the following with reference to the following drawings.

DETAILED DESCRIPTION

Figure 1:
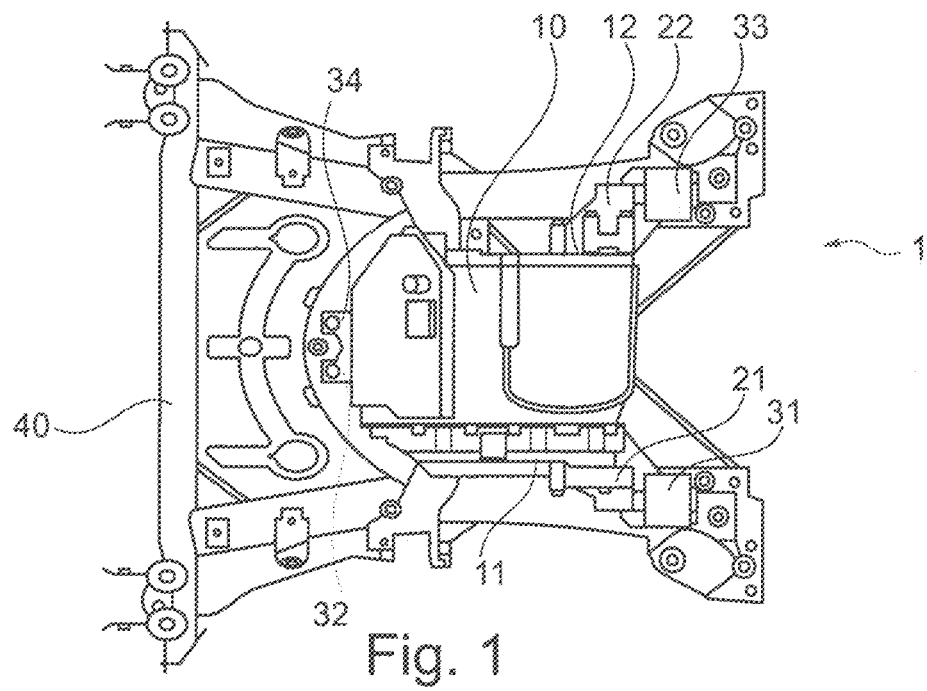
FIG. 1 shows schematically and exemplarily an example of a top view of a powertrain assembly in an assembled state according to the present disclosure.
Figure 7:
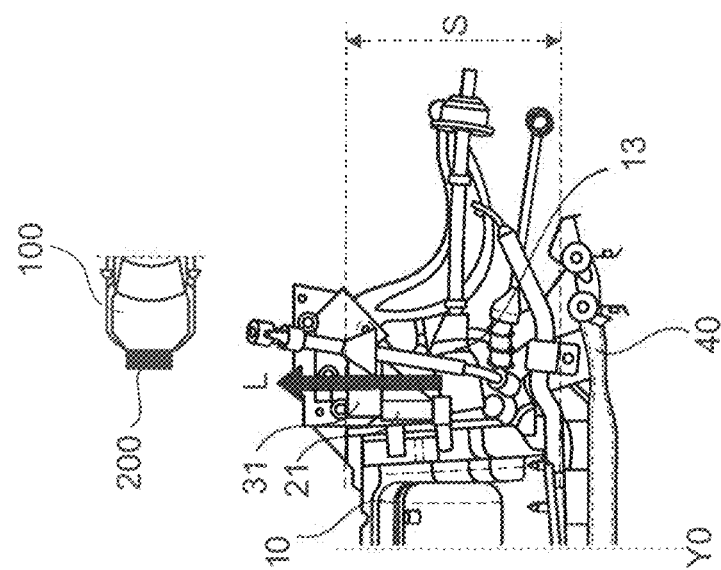
FIG. 7 shows schematically and exemplarily an example of a top view a powertrain assembly during a frontal collision according to the present disclosure.
Figure 8:
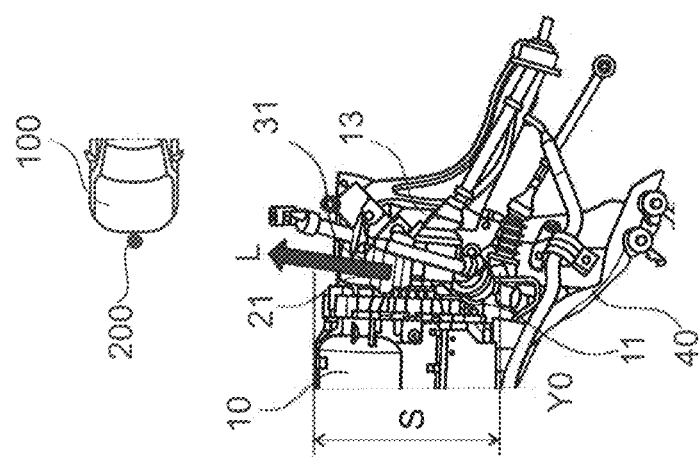
FIG. 8 shows schematically and exemplarily an example of a top view a powertrain assembly during a frontal collision according to the present disclosure.
Figure 9:
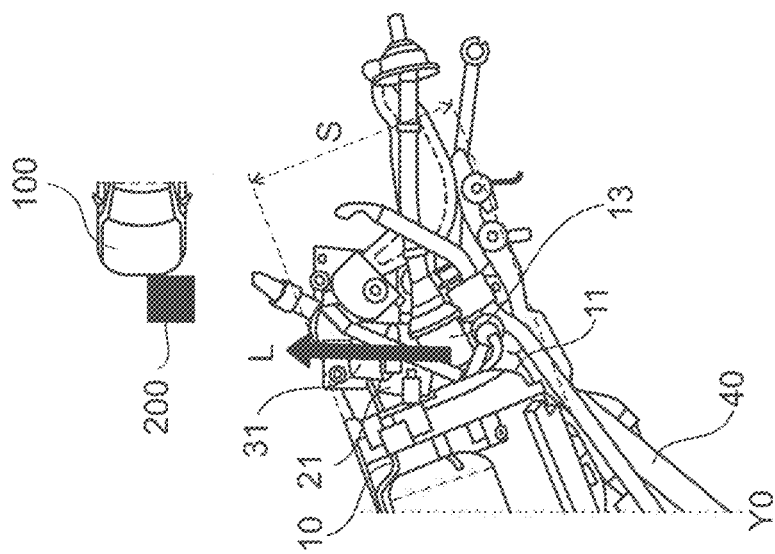
FIG. 9 shows schematically and exemplarily an example of a top view a powertrain assembly during a frontal collision according to the present disclosure.

FIG. 1 shows a powertrain assembly 1, which may be integrated in a vehicle 100 (see also FIG. 7 to FIG. 9). Preferably, the vehicle 100 may be a battery electric vehicle or a hybrid vehicle including an energy storage system for supplying energy to propel the vehicle 100. Such energy storage system may be arranged close to a vehicle cabin. Hence, in case of a vehicle collision, the vehicle cabin and/or the energy storage system may be invaded by components surrounding the vehicle cabin and/or the energy storage system. The powertrain assembly 1 according to the present disclosure may avoid or at least minimize intrusions of components, particularly arranged in an engine compartment and/or a front overhang of the vehicle 100 into the vehicle cabin and/or the energy storage system. Hence, safety of the vehicle 100 may be improved.

The powertrain assembly 1 includes a powertrain unit 10, which may be an electric front axle drive (EFAD) unit having a drive shaft 13. The powertrain unit 10 is attached to a frame element 40 by means of powertrain mounts, wherein the frame element 40 is connectable to a vehicle body portion 50. The powertrain unit 10 is arranged on the frame element 40 such that the drive shaft 13 of the powertrain unit 10 is aligned perpendicular to a driving direction of the vehicle 100.

The powertrain mounts may include a first mount 31, a second mount 32, a third mount 33 and a fourth mount 34, which may be, for instance a rubber bushing, and fixedly attached to the frame element 40 to hold the powertrain unit 10 in an initial position. The first mount 31 and the second mount 32 may be arranged at a first end side 11 of the powertrain unit 10 and third mount 33 and the fourth mount 34 may be arranged at a second end side 12 of the powertrain unit 10 and vice versa. The end sides 11, 12 of the powertrain unit 10 are arranged substantially perpendicular to the longitudinal axis of the drive shaft 13.

The first mount 31 and the third mount 33 are arranged at an opposite side of the second mount 32 and the fourth mount 34, respectively, relative to the powertrain unit 10. In other words, the first mount 31 and the third mount 33 are arranged at a rear side of the powertrain unit 10 and/or the frame element 40 facing the vehicle cabin. Further, the second mount 32 and the fourth mount 34 are arranged at a front side of the powertrain unit 10 and/or the frame element 40 relative to the driving direction of the vehicle 100.

The powertrain unit 10 is connected to each of the first mount 31 and the third mount 33 via a first coupling arm 21 and a second coupling arm 22. Accordingly, the first coupling arm 21 is arranged between the first end side 11 of the powertrain unit 10 and the first mount 31, and the second coupling arm 22 is arranged between the second end side 12 of the powertrain unit 10 and the third mount 33. In contrast, the second mount 32 and the fourth mount 34 are directly attached to the front side of the powertrain unit 10. In other words, the second mount 32 and the fourth mount 34 directly connect the frame element 40 to the powertrain unit 10 without any coupling arm. An axial direction of each of the first mount 31 and the third mount 33 is aligned substantially perpendicular to the drive shaft 13 of the powertrain unit 10, whereas the second mount 32 and/or the fourth mount 34 may be arranged substantially parallel to the drive shaft 13 of the powertrain unit 10.

Figure 2:
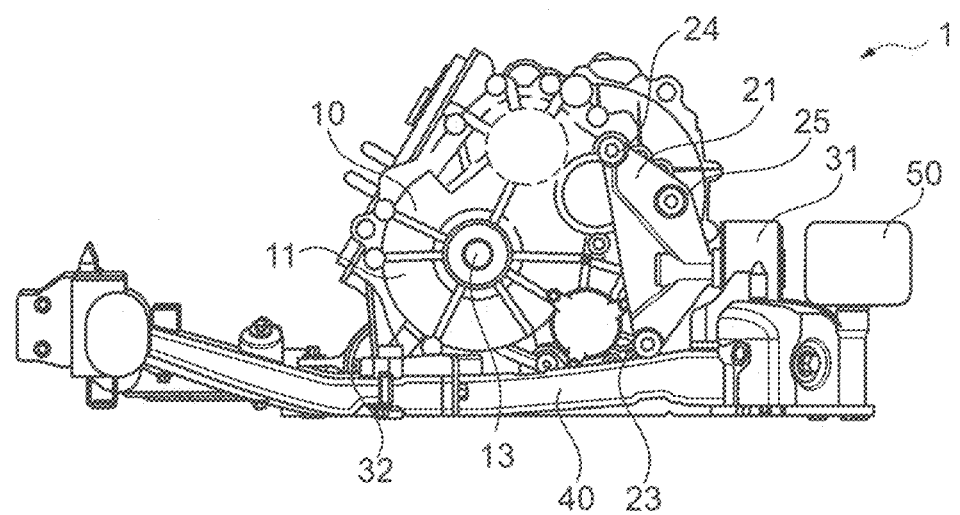
FIG. 2 shows schematically and exemplarily an example of a side view a powertrain assembly in an assembled state according to the present disclosure.

Each of the first coupling arm 21 and the second coupling arm 22 is connected to the powertrain unit 10 by several fixing elements. The fixing element may be any kind of fasteners such as screw, bolt, pin, plug, nail or the like. As shown in FIG. 2, the first coupling arm 21 includes a first fixing element 23, a second fixing element 24 and a third fixing element 25. They are positioned in the first coupling arm 21 such that the first fixing element 23 is arranged closest to the first mount 31, the second fixing element 24 is arranged farthest from the first mount 31 and the third fixing element 25 is arranged between the first fixing element 23 and the third fixing element 25. To receive the fixing elements, the first coupling arm 21 includes holes, which may have different sizes. The second coupling arm 22 is formed essentially the same as the first coupling arm 21.

The first fixing element 23 and the third fixing element 25 are configured to be sheared off during the vehicle collision. Preferably, the third hole arranged in the first coupling arm 21 for receiving the third fixing element 25 is bigger than the first hole arranged in the first coupling arm 21 for receiving the first fixing element 23 to prompt the first fixing element 23 to be sheared off prior to the third fixing element 25 during the vehicle collision. Meanwhile, the second fixing element 24 is configured to hold the powertrain unit 10 during the vehicle collision. At an end stage of the vehicle collision, the second fixing element 24 may be also sheared off from the first coupling arm 21.

Figure 3:
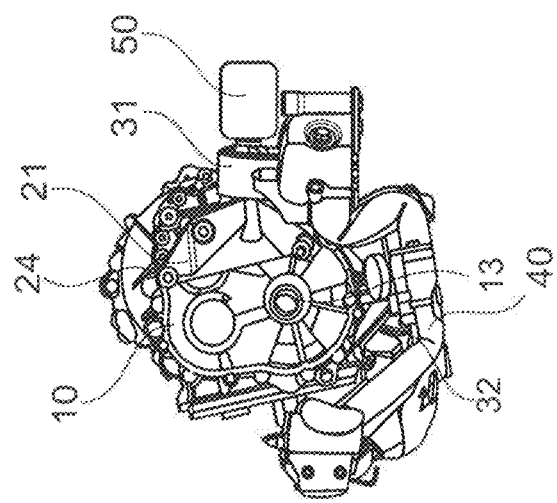
FIG. 3 shows schematically and exemplarily an example of a side view a powertrain assembly in an early stage during a vehicle collision according to the present disclosure.
Figure 4:
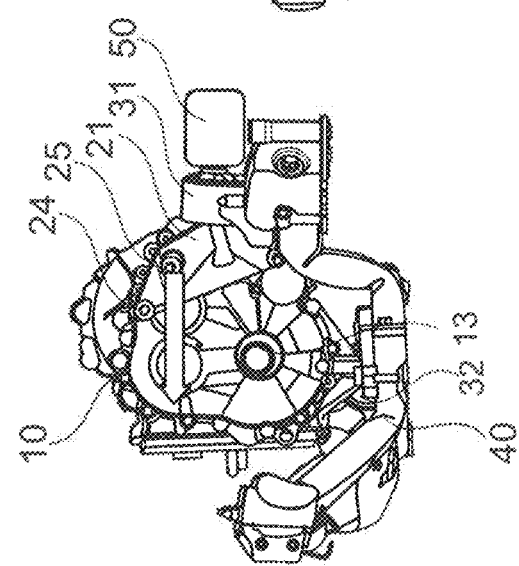
FIG. 4 shows schematically and exemplarily an example of a side view a powertrain assembly during a vehicle collision according to the present disclosure.
Figure 5:
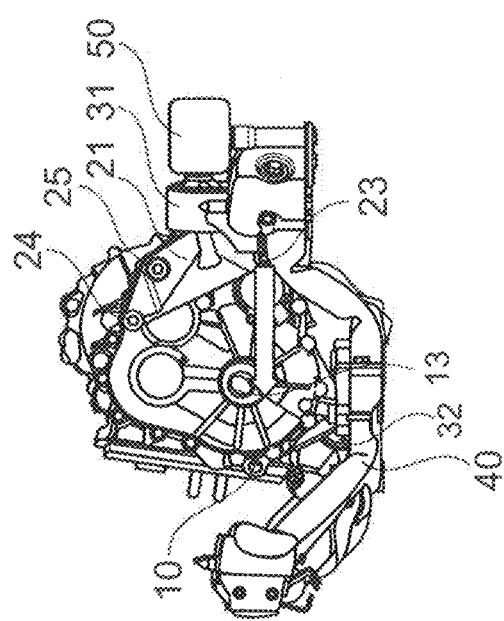
FIG. 5 shows schematically and exemplarily an example of a side view a powertrain assembly in a late stage during a vehicle collision according to the present disclosure.

FIG. 3 to FIG. 5 show a deformation of the frame element 40 during the vehicle collision and a displacement of the powertrain unit 10 in a radial direction of the drive shaft 13. The frame element 40 is deformable substantially in a collision direction of the vehicle 100 in case of the vehicle collision, and the powertrain unit 10 is movable along the deformation of frame element 40.

In an early stage of the vehicle collision, the frame element 40 is pressed in the vehicle collision direction. Thus, the powertrain unit 10 attached to the frame element 40 via the mounts and/or the coupling arms may be also shifted in the vehicle collision direction, i.e. in direction of the vehicle cabin. Accordingly, the first coupling arm 21 and/or the second coupling arm 22 clashes with the first mount 31 and/or the third mount 33, respectively. As shown in FIG. 3, the first fixing element 23 is configured to receive shear off force caused by the clash of the first coupling arm 21 into the first mount 31. Accordingly, the first fixing element 23 is sheared off from the first coupling arm 21 and the powertrain unit 10 is at least partially disconnected from the first coupling arm 21.

As the vehicle collision is proceeded, the frame element 40 may be further pushed in the vehicle collision direction, e.g. in the direction of the vehicle cabin, and the first coupling arm 21 further clashes into the first mount 31. Accordingly, the third fixing element 25 is also sheared off from the first coupling arm 21, as shown in FIG. 4.

Meanwhile, the second fixing element 24 remains attached between the first coupling arm 21 and the powertrain unit 10 and forms a rotation axis for the powertrain unit 10 along the deformation of the frame element 40, as shown in FIG. 5. Accordingly, vehicle crash pulse can be reduced and intrusions of components arranged in the front overhang can be avoided or at least minimized. Depending on types of the vehicle collision, the second coupling arm 22 can have substantially the same behavior as the first coupling arm 21.

The first coupling arm 21 and/or the second coupling arm 22 may include more than three fixing elements connecting the powertrain unit 10, which may be also sheared off along the deformation of the frame element 40. However, it is important that the second fixing element 24 arranged farthest from the first mount 31 may hold the powertrain unit 10 until a late stage of the vehicle collision to allow the powertrain unit 10 to rotate around an axial direction of the second fixing element 24. Accordingly, a stack up distance between the drive shaft 13 and the first coupling arm 21 may be minimized, thus safety of the vehicle 100 during the vehicle collision may be improved.

Figure 6:
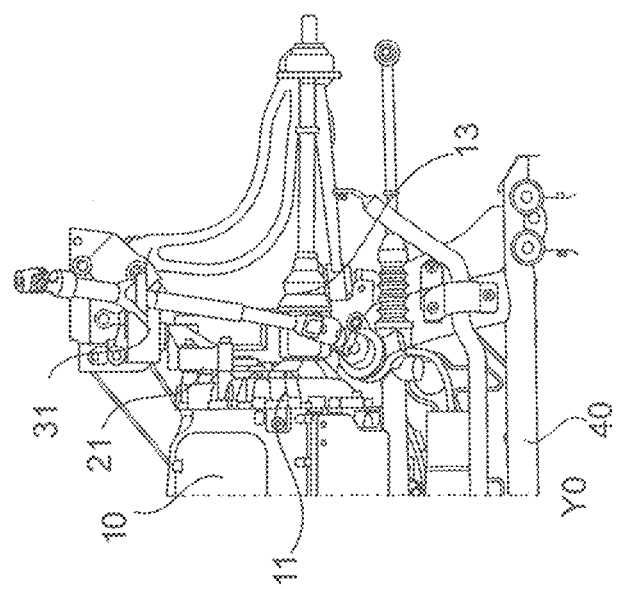
FIG. 6 shows schematically and exemplarily an example of a top view a powertrain assembly in an assembled state according to the present disclosure.

FIG. 6 shows a top view of the powertrain assembly 1 in an assembled state without the vehicle collision, as described above. FIG. 7 shows a top view of the powertrain assembly 1 in an end stage of the vehicle collision, particularly full front rigid barrier (FFRB). In the FFRB collision, a bulk-shaped obstacle 200 can be crashed substantially against a center of a foremost portion of the vehicle 100. In such a case, substantially entire front part of the frame element 40 can be deformable in direction to the vehicle cabin. The powertrain unit 10, which is at least partially disconnected from the first coupling arm 21 and/or the second coupling arm 22, can provide further deformation space by displacing its drive shaft 13 in direction to the first mount 31. Accordingly, the stack-up distance S between the drive shaft 13 and the first coupling arm 21 can be minimized and crash force can be transferred along a stacked-up load path L, which leads the crash force to each lateral side of the vehicle 100, i.e. away from a central longitudinal axis Y0 of the vehicle 100. Hence, safety of the vehicle 100 can be improved.

FIG. 8 shows a top view of the powertrain assembly 1 in an end stage of the vehicle collision, particularly offset deformable barrier (ODB). In the OBD collision, a bulk-shaped obstacle 200 can be crashed substantially against a lateral side of the front overhang of the vehicle 100. In such a case, substantially the crashed front part of the frame element 40 can be deformable in direction to the vehicle cabin. The powertrain unit 10, which is at least partially disconnected from the first coupling arm 21 and/or the second coupling arm 22, can provide further deformation space by displacing its drive shaft 13 in direction to the first mount 31. Accordingly, the stack-up distance S between the drive shaft 13 and the first coupling arm 21 can be minimized can be minimized and crash force can be transferred along a stacked-up load path L, which leads the crash force to each lateral side of the vehicle 100, i.e. away from the central longitudinal axis Y0 of the vehicle 100. Hence, safety of the vehicle 100 can be improved.

FIG. 9 shows a top view of the powertrain assembly 1 in an end stage of the vehicle collision, particularly central pole collision. In the central pole collision, a rod-shaped obstacle 200 extending in a vertical direction can be crashed substantially against a center of a foremost portion of the vehicle 100. In such a case, the frame element 40 can be deformable forming substantially a concave shape in direction to the vehicle cabin. The powertrain unit 10, which is at least partially disconnected from the first coupling arm 21 and/or the second coupling arm 22, can provide further deformation space by displacing its drive shaft 13 in direction to the first mount 31. Accordingly, the stack-up distance S between the drive shaft 13 and the first coupling arm 21 can be minimized can be minimized and crash force can be transferred along a stacked-up load path L, which leads the crash force to each lateral side of the vehicle 100, i.e. away from a central longitudinal axis of the vehicle 100. Hence, safety of the vehicle 100 can be improved.

It has to be noted that examples of the disclosure are described with reference to different subject matters. In particular, some examples are described with reference to method type claims whereas other examples are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed examples. Other variations to the disclosed examples can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A powertrain assembly for a vehicle, the powertrain assembly comprising:
   a powertrain unit with a drive shaft;
   at least a first mount; and
   at least a first coupling arm;
   the drive shaft of the powertrain unit being arranged substantially perpendicular to a driving direction of the vehicle;
   the first mount being arranged substantially perpendicular to the drive shaft;
   the first coupling arm being arranged between a first end side of the powertrain unit and the first mount;
   the first coupling arm being connected to the powertrain unit by means of at least a first fixing element to hold the powertrain unit in an initial position;
   the first coupling arm being configured to clash into the first mount in case of a vehicle collision;
   the first fixing element being configured to be sheared off from the first coupling arm to at least partially disconnect the powertrain unit from the first coupling arm after the clash of the first coupling arm into the first mount;
   a second fixing element, the second fixing element being connected between the powertrain unit and the first coupling arm and configured to hold the powertrain unit during the vehicle collision; and
   the powertrain unit being configured to rotate around the second fixing element in case of the vehicle collision in order to reduce vehicle crash pulse and/or intrusions in direction to a vehicle cabin.

2. The powertrain assembly according claim 1, further comprising a second mount arranged at an opposite side of the first mount relative to the drive shaft of the powertrain unit, the second mount being arranged substantially perpendicular to the first mount.

3. The powertrain assembly according to claim 2, further comprising a frame element, the frame element being connectable to a vehicle body portion, the first mount and/or the second mount being attached to the frame element.

4. The powertrain assembly according to claim 3, the frame element being deformable substantially in a reverse driving direction of the vehicle in case of the vehicle collision, and the powertrain unit being movable along the deformation of frame element.

5. The powertrain assembly according to claim 2, further comprising a second coupling arm and a third mount, the second coupling arm and the third mount being arranged at an opposite side of the first coupling arm and the first mount relative to the powertrain unit.

6. The powertrain assembly according to claim 5, at least one of the first coupling arm and the second coupling arm being configured to stack up against the drive shaft of the powertrain unit in an end stage of the vehicle collision.

7. The powertrain assembly according to claim 1, further comprising a third fixing element, the third fixing element being arranged at the first coupling arm to further connect the first coupling arm to the powertrain unit, and the third fixing element being configured to be sheared off from the first coupling arm in case of the vehicle collision.

8. The powertrain assembly according to claim 7, the first fixing element, second fixing element and/or the third fixing element being configured to receive shear off force induced by the clash of the first coupling arm into the first mount.

9. The powertrain assembly according to claim 7, the first coupling arm comprising several holes for receiving each of the first fixing element, the second fixing element and the third fixing element, the holes comprising a different size.

10. The powertrain assembly according to claim 9, the third fixing element being arranged between the first fixing element and the second fixing element, the first fixing element, the second fixing element and the third fixing element being configured to be sheared off from the first coupling arm sequentially.

11. A vehicle comprising the powertrain assembly according to claim 1, the vehicle being a battery electric vehicle or a hybrid electric vehicle.

12. The vehicle according to claim 11, the powertrain unit comprising an electric front axle drive (EFAD) unit.

13. A method for manufacturing a powertrain assembly for a vehicle, the method comprising:
   arranging a drive shaft of a powertrain unit substantially perpendicular to a driving direction of the vehicle;
   arranging a first mount substantially perpendicular to the drive shaft;
   arranging a first coupling arm between a first end side of the powertrain unit and the first mount; and
   connecting the first coupling arm to the powertrain unit by means of at least a first fixing element to hold the powertrain unit in an initial position;
   the first coupling arm being configured to clash into the first mount in case of a vehicle collision;
   the first fixing element being configured to be sheared off from the first coupling arm to at least partially disconnect the powertrain unit from the first coupling arm after the clash of the first coupling arm into the first mount;
   connecting a second fixing element between the powertrain unit and the first coupling arm, the second fixing element being configured to hold the powertrain unit during the vehicle collision; and the powertrain unit being configured to rotate around the second fixing element in case of the vehicle collision in order to reduce vehicle crash pulse and/or intrusions in direction to a vehicle cabin.

14. A powertrain assembly for a vehicle, the powertrain assembly comprising:

a powertrain unit with a drive shaft;

at least a first mount; and at least a first coupling arm;

the drive shaft of the powertrain unit being arranged substantially perpendicular to a driving direction of the vehicle;

the first mount being arranged substantially perpendicular to the drive shaft;

the first coupling arm being arranged between a first end side of the powertrain unit and the first mount;

the first coupling arm being connected to the powertrain unit by means of at least a first fixing element to hold the powertrain unit in an initial position;

the first coupling arm being configured to clash into the first mount in case of a vehicle collision;

the first fixing element being configured to be sheared off from the first coupling arm to at least partially disconnect the powertrain unit from the first coupling arm after the clash of the first coupling arm into the first mount;

a second mount arranged at an opposite side of the first mount relative to the drive shaft of the powertrain unit, the second mount being arranged substantially perpendicular to the first mount;

a second coupling arm and a third mount, the second coupling arm and the third mount being arranged at an opposite side of the first coupling arm and the first mount relative to the powertrain unit; and at least one of the first coupling arm and the second coupling arm being configured to stack up against the drive shaft of the powertrain unit in an end stage of the vehicle collision.

15. The powertrain assembly according to claim 14, further comprising a frame element, the frame element being connectable to a vehicle body portion, the first mount and/or the second mount being attached to the frame element.

16. The powertrain assembly according to claim 15, the frame element being deformable substantially in a reverse driving direction of the vehicle in case of the vehicle collision, and the powertrain unit being movable along the deformation of frame element.

17. The powertrain assembly according to claim 14, further comprising a second fixing element, the second fixing element being connected between the powertrain unit and the first coupling arm and configured to hold the powertrain unit during the vehicle collision, the powertrain unit being configured to rotate around the second fixing element in case of the vehicle collision in order to reduce vehicle crash pulse and/or intrusions in direction to a vehicle cabin.

18. The powertrain assembly according to claim 17, further comprising a third fixing element, the third fixing element being arranged at the first coupling arm to further connect the first coupling arm to the powertrain unit, and the third fixing element being configured to be sheared off from the first coupling arm in case of the vehicle collision.

* * * * *